G. H. VANDERSLICE.
SINGLE BEAD MOLDING OR WELT.
APPLICATION FILED APR. 8, 1918.

1,283,372.

Patented Oct. 29, 1918.

Witness
Frank A. Fahle

Inventor
George Hamilton Vanderslice,
By Hood & Schley
Attorneys ature patent office.

GEORGE HAMILTON VANDERSLICE, OF INDIANAPOLIS, INDIANA, ASSIGNOR TO ZENITE METAL COMPANY, OF INDIANAPOLIS, INDIANA, A CORPORATION OF INDIANA.

SINGLE-BEAD MOLDING OR WELT.

1,283,372.

Specification of Letters Patent.

Patented Oct. 29, 1918.

Application filed April 8, 1918. Serial No. 227,295.

*To all whom it may concern:*

Be it known that I, GEORGE HAMILTON VANDERSLICE, a citizen of the United States, residing at Indianapolis, in the county of Marion and State of Indiana, have invented a new and useful Single-Bead Molding or Welt, of which the following is a specification.

It is the object of my invention to provide a flexible single bead molding or welt of simple construction and chaste appearance, for use on automobile and other upholstery; and one which may be attached by concealed tacks which may nevertheless be driven through the molding after it is completed and when it is being applied, which may be applied with ease by the workman, even around corners, and when applied holds itself firmly in shape, and which when in position sheds water so as to prevent deterioration of the material of the molding, rotting of the stitching, and rusting of the attaching tacks.

Figure 1:
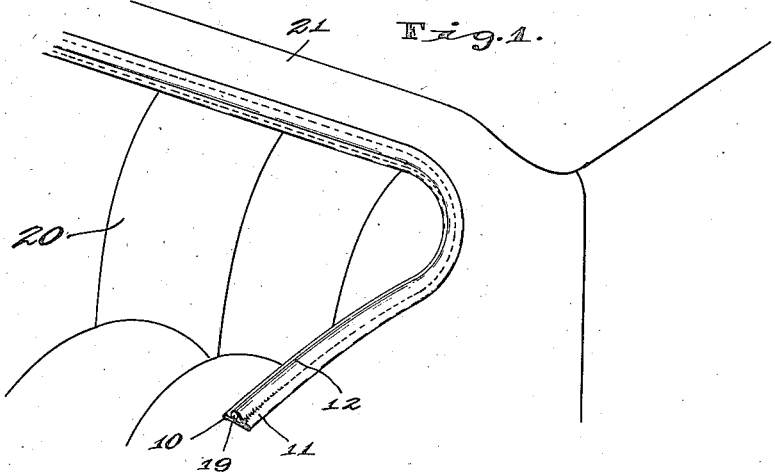
Figure 2:
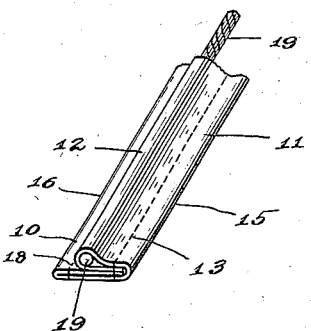
Figure 3:
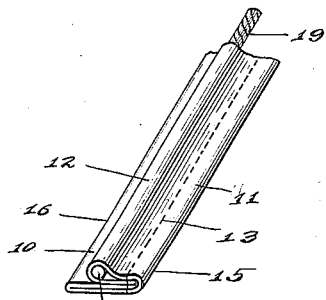
Figure 5:
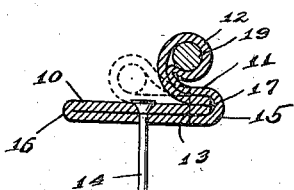
Figure 4:
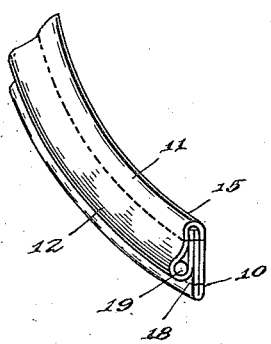

The accompanying drawing illustrates my invention. Figure 1 is a perspective view of a fragment of an automobile, showing my improved molding applied to the upper edge of the upholstery of the seat back; Figs. 2 and 3 are perspective views of two slightly different forms of my improved molding; Fig. 4 is a perspective view of the form of molding shown in Fig. 2, showing it somewhat curved; and Fig. 5 is an enlarged transverse section through the form of molding shown in Fig. 3, in the plane of one of the attaching tacks, showing in full lines the bead bent back to permit the driving of the tack and in dotted lines the bead in its normal position concealing the tack.

The molding consists primarily of a base strip 10 and a single superposed bead strip 11, the latter overlying one side of the upper face of the base strip 10 and being formed at one edge with a bead 12 which extends longitudinally along the base strip 10, preferably at an intermediate point of the width of such base strip though not necessarily along the middle line thereof. The base strip and bead strip are formed of leather, imitation leather, fabric, or other flexible sheet material, and are stitched together along the line 13 where they overlie, between the bead 12 and the common edge of the base strip 10 and bead strip 11. By this construction the bead 12 may be raised by folding back the bead strip 11 along the line of the stitching 13 (as shown in full lines in Fig. 4), thus exposing the upper face of the base strip 10 beneath it; and the attaching tacks 14 may then be driven through such exposed portion of the base strip, and the lifted bead strip may be swung back to its normal position (shown in dotted lines in Fig. 4) so that it overlies the heads of the attaching tacks 14 and conceals and protects them. This lifting of the bead 12 may be done very easily by the workman, because he can readily get his thumb under the bead to lift it even when working around sharp corners, and whether the corners are concave or convex, and indeed when working around these corners the bead may be made to hold itself lifted until positively folded back into place by the workman, thus making it easier for him to drive the attaching tacks. However, when the bead 12 is folded back to its normal position it holds itself firmly in such position, covering and concealing the tacks.

Preferably the base strip 10 and the bead strip 11 are formed of a single piece of material, folded over to form the edge 15 joining the two strips; and each strip is formed of two layers folded from the same single piece of material to form the other folded edge 16 of the base strip and the bead 12 respectively, with the raw edges 17 folded on the inside within the folded edge 15 between such edge and the stitching 13 so that such raw edges are entirely concealed and the stitching 13 passes through both layers of both strips. Thus the finished molding presents no visible raw edges. In the wider moldings, I prefer to use an additional line of stitching near the edge 16, as shown in Fig. 2. The bead strip 11 may or may not overlie this extra line of stitching 18, as desired. This additional stitching 18 merely stitches together the two layers of the base strip 10, and ordinarily is not used in the narrower moldings. The bead 12 is formed by folding the bead edge of the material of the bead strip around a cylindrical core 19, as of paper cord.

When this molding is used, as around the upper edge of the seat back 20 of an automobile 21 of which a fragment is shown in Fig. 1, such molding may be curved as desired, on account of the flexibility of the material composing it, and may be fastened in the desired place by driving in the tacks 14. The bead 12 is lifted to permit the driving in of the tacks and is then swung back to normal position to cover and conceal the heads of the tacks. The molding is applied with the edge 15 uppermost, so that the bead strip 11 with its bead 12 will act as a water shed to drain water away from the heads of the tacks 14, and so that the groove beneath the bead 12 and between the two strips will not act as a pocket for catching dirt or water. By thus preventing the collecting of water beneath the bead, the rotting of the fabric and of the stitching, such as occurs in many other forms of molding, is avoided. When in place, the molding presents a pleasing appearance, with no visible attaching means and no visible raw edges.

I claim as my invention:

1. An upholstery molding, comprising a single strip of flexible material folded to form a base strip and a single bead strip overlying one face of said base strip with the fold forming their common edge, said bead strip being formed with a longitudinal bead extending along an intermediate longitudinal line of the base strip, and the base strip and bead strip being stitched together between said folded edge and said bead.

2. An upholstery molding, comprising a single strip of flexible material folded to form a base strip and a single superposed bead strip overlying one face of the base strip with the fold forming their common edge, each of said strips comprising two layers folded from the same strip with the layer having the raw edge forming the face toward the other strip so that the raw edges are concealed within the fold between the two strips, said bead strip being formed with a longitudinally extending bead and the two strips being stitched together through both layers of both strips on a line between said bead and the fold at the common edge of the two strips.

3. An upholstery molding, comprising a single strip of flexible material folded to form a base strip and a single superposed strip overlying one face of the base strip with the fold forming their common edge, each of said strips comprising two layers folded from the same strip with the layer having the raw edge forming the face toward the other strip so that the raw edges are concealed within the fold between the two strips, the two strips being stitched together through both layers of both strips on an intermediate line between the edges of the strips so that the parts of said strips on the opposite side of said stitching from such common folded edge may be separated.

In witness whereof, I have hereunto set my hand at Indianapolis, Indiana, this fourth day of April, A. D. one thousand nine hundred and eighteen.

GEORGE HAMILTON VANDERSLICE.